C. BORNMANN & G. W. TOPLIFF.
PHOTOGRAPHIC CAMERA.
APPLICATION FILED DEC. 14, 1911.
1,037,721.
Patented Sept. 3, 1912.
2 SHEETS—SHEET 1.
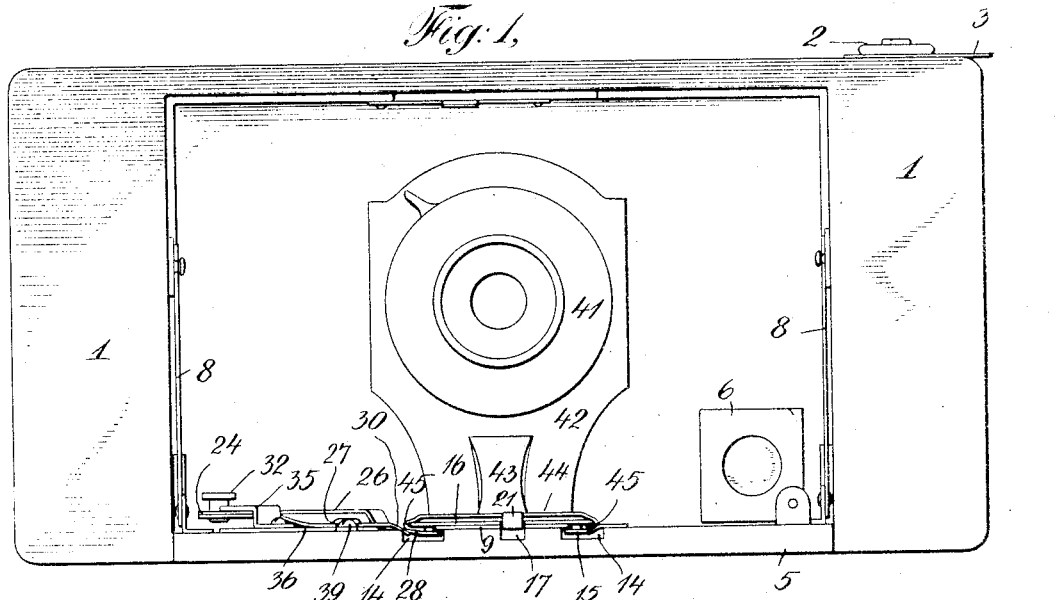
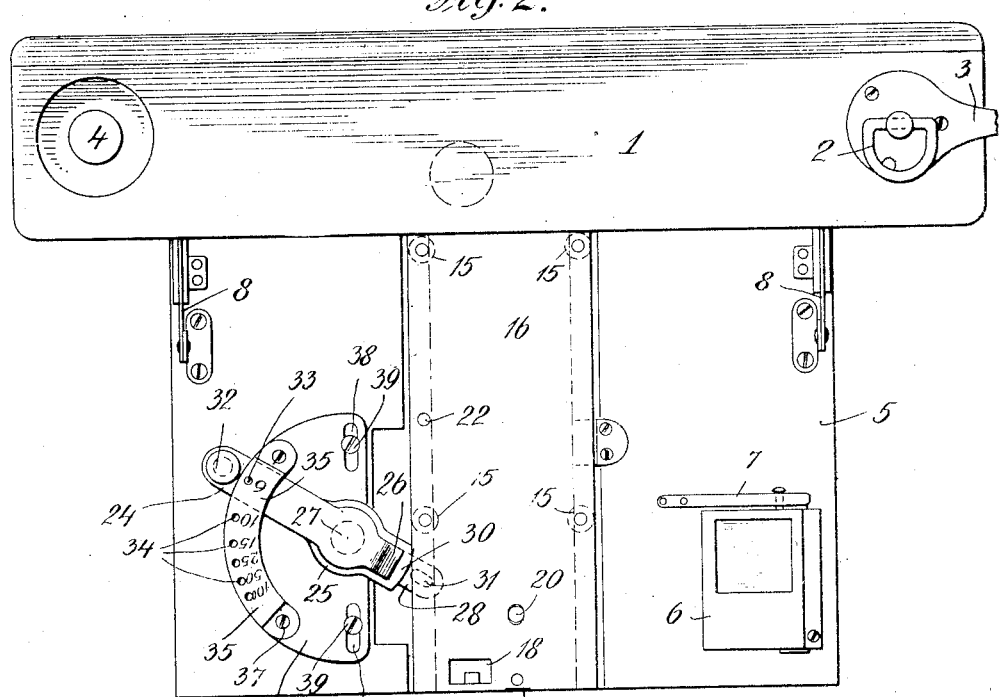

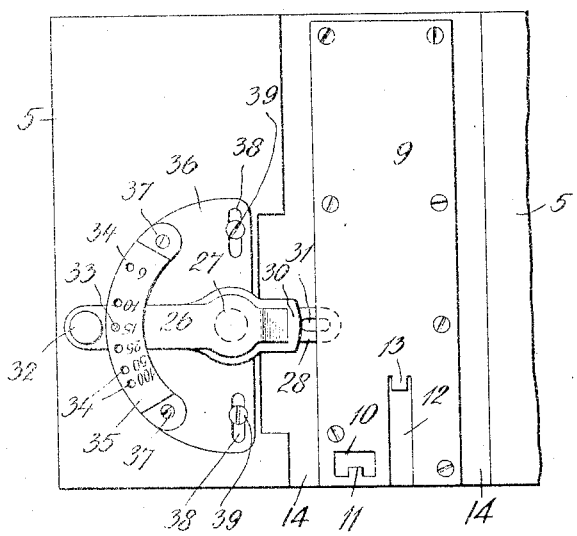

UNITED STATES PATENT OFFICE.

CARL BORNMANN AND GEORGE W. TOPLIFF, OF BINGHAMTON, NEW YORK, ASSIGNORS TO ANSCO COMPANY, OF BINGHAMTON, NEW YORK.

PHOTOGRAPHIC CAMERA.

1,037,721.      Specification of Letters Patent.      Patented Sept. 3, 1912.

Application filed December 14, 1911. Serial No. 665,761.

*To all whom it may concern:*

Be it known that we, CARL BORNMANN and GEORGE W. TOPLIFF, both citizens of the United States, and residents of the city of Binghamton, county of Broome, State of New York, have jointly invented certain new and useful Improvements in Photographic Cameras, of which the following is a full, clear, and exact description.
This invention is an improvement upon that described and claimed in another application for Letters Patent filed concurrently herewith Serial Number 665,778. It will therefore not be necessary to elaborately describe the structure as a whole, but merely to suitably designate the parts and then specifically describe the features constituting the essentials of this present invention.

It is our purpose in this present invention to provide means whereby the mere movement of the automatic lock focus lever to points indicated upon a suitable index, which designate the focal distances, will automatically move the lens to such positions as will properly correspond to those distances.

We illustrate the invention as applied to a folding camera because its advantages are more pronouncedly realized in that form.
It is however well adapted to practically all forms of cameras. We therefore do not limit ourselves to any particular variety.

Referring to the drawings, Figure 1 illustrates an elevation of a camera the front board of which has been lowered, thus exposing the interior parts: Fig. 2 illustrates a plan view of that which is shown in Fig. 1; Fig. 3 illustrates a plan view of the pivoted automatic lock focus lever and its supporting base plate, showing the slideway for the movable lens supporting plate; Fig. 4 illustrates a view of the underside of the movable lens supporting plate: Fig. 5 illustrates an edgewise view of that which is shown in Fig. 4: Fig. 6 illustrates a side elevation of that which is shown in Fig. 1, certain of the unimportant parts being omitted, the movable lens supporting plate and its slideway being shown in elevation, the front board partially in section, and the automatic lock focus apparatus mostly removed; Fig. 7 illustrates a vertical sectional view through the pivoted lock focus lever and associated parts, a part of the lever being shown in elevation; Fig. 8 illustrates a detail.

In the drawings 1 represents the body or box part of the camera, 2 the thumb piece of an ordinary winding key, 3 a horn projecting from the casing of the winding key to which the handle is attached, 4 one of the journals for the stockspool, 5 the hinged front board, 6 the finder, 7 the spring control for the finder, and 8, 8, the ordinary supports for the front board. All these parts are or may be of any preferred construction.

The parts embodied in the invention described and claimed in our concurrently filed application Serial No. 665,778 filed December 14, 1911, and likewise employed in this present invention, are as follows: 9 is the slideway plate rigidly fastened to the front board in any preferred manner, 10 is the opening therein in which is the stud 11 which engages with a suitable latch on the body of the camera for holding the front board up when closed, as usual. 12 is a slot cut in the plate 9, the inner end 13 of which is downwardly inclined as shown best in Fig. 8. 14, 14, are grooves cut in the front board for the reception of parts of the lock focusing apparatus and to afford space for the guiding studs 15 on the under side of the movable lens carrying plate 16. 17 is another groove for a purpose hereinafter stated. The studs 15 are headed as shown and provided with contracted stems whereby the plate 16 may be guided in its movement upon the slideway plate 9 as fully set forth in said concurrently filed case. 18 is an opening in the movable plate 16, which is adapted to register with the opening 10 in the slideway plate 9. 19 is a spring fastened to the movable plate 16, the free end of which is bent downwardly, as shown best in Fig. 8. 20 is a pin carried by the spring 19, which passes through a hole in the movable plate 16. 21 is the forward end of this spring, which is bent upwardly to form a stop, and 22 is a pin on the under side of the movable plate 16 located near one edge thereof, see Fig. 4, adapted to engage with the end of the automatic lock focusing devices in a manner about to be described.

Referring now to the features which constitute the essentials of this present invention, 24 is the lock focusing lever. It is composed of two parts 25 and 26. The part 25 is pivoted upon a pivot 27 riveted to a base plate about to be described. The forward end 28 of the part 26 is bent downwardly as shown best in Fig. 7 and passes through an opening 29 made in the part 25, there being a cross member 30 of the part 25, which acts as a confiner for the forward end of the part 26 and in the part 28 as best shown in Fig. 3, there is a longitudinally extending slot 31 with which engages the pin 22 as shown clearly in Figs. 6 and 7. The opposite end of the two part lever is provided with a thumb piece 32 and adjacent to the thumb piece is a pin 33 adapted to enter either one of a series of holes 34, 34, made in a curved index plate 35 and upon the surface of this plate opposite each hole appear the appropriate figures designating the focal distance pertaining to that hole.

36 is a base plate which supports the automatic lock focus lever and all its co-acting parts. The pivot 27 is riveted to it by screws or the index plate is attached to it by screws or rivets 37 and it in turn is provided with slots 38 in which work screws 39 whereby the plate may be adjusted on the front board of the camera. The adjustment will be effected at the factory of the manufacturer and is provided in order that slight discrepancy or variance in the focal length of the lens, which is apt to occur, may be compensated for.

40 represents the bellows, 41 the casing for the lens, 42 the downwardly extending lens supporting frame, 43 a brace for the part 42, and 44 a base part to which the lens supporting frame 42, 43, is rigidly secured. The edges of the part 44 shown at 45 in Fig. 1, embrace the edges of the movable plate 16 as shown in Fig. 1.

The operation is as follows: The front of the camera is lowered as usual, disclosing the interior apparatus. The sliding plate 16 is at this stage in its retracted position, as shown best in Fig. 2, in which the movable end of the spring 19 is in engagement with the inner end 13 (see Fig. 3) of the slot 12 in the slideway plate 9, so that the spring is deflected downwardly and the pin 20 carried by it is correspondingly depressed, as shown in Fig. 8. The operator having first preferably swung the finder outwardly, or to the right, so as to give himself more space for the manipulation of the lens frame and attached parts, lays hold of the lens frame, preferably by means of the brace 43, since that serves as a convenient and properly located handle, and pulls the lens frame forwardly, whereupon the turned under edges 45 of the base 44 of the lens frame will properly engage with the edges of the movable plate 16. The lens frame is then pulled farther forwardly, during which act it will slide smoothly over the movable plate 16, until the forward end of the base 44 strikes the stop 21 of the upturned end of the spring 19, as shown in Fig. 6, and thereafter during any further outward movement of the lens frame the movable plate 16 will be carried with it and in so doing the inner free end of the spring 19 will be removed from contact with the end 13 of the slot 12 in the plate 9 and the spring then closing upwardly against the bottom of the plate 16 will project the pin 20 also upwardly, so that it will pass through a hole made in the top of the base 44, as shown clearly in Fig. 6. In this way the lens frame will be securely and automatically locked to the sliding plate 16 and prevented from backward movement when released by the operator.

Referring now to the method of securing proper focal distances, it is effected in the following manner. The holes 34 have been carefully spaced in the curved index plate 35 to coincide with predetermined focal distances. For example, in the case illustrated, the hole nearest the body of the camera is adapted for six feet, and the others in succession for ten, fifteen, twenty-five, fifty and one hundred feet respectively. The automatic focusing lever may beneficially, although not necessarily be left in the position shown in Fig. 3, that is to say, at substantially right angles to the central part of the index plate 35 and during the outward movement of the movable plate 16, the pin 22 which is carried by that plate, moves by the side of the slideway 9, as shown in Fig. 7, and during the outward movement of the plate 16, this pin comes in contact with the inclined side of the terminal part 28 of the lever and as the plate is still farther moved outwardly, the pin pressing against the inclined side of the part 28 (see Fig. 6) depresses that end of the lever until finally the pin comes in registration with the slot in the part 28. This slot is made oblong so that this registration will take place whatever the position of the lever may be. As soon as the pin registers with the slot the spring action of the lever causes the pin to enter the slot and thus these parts are located together. It will be noted that this engagement is automatic. Thereupon any desired position of the lens to accord with any desired focal distance may be readily secured by depressing the thumb screw 32 of the lever, which will withdraw the pin 33 from such one of the holes 34 as it may then be in and swinging the lever to right or left as occasion may require, which will correspondingly move the plate 16, carrying the lens and bellows with it inwardly or outwardly, as the case may be. When desired to close the camera again, the pin 22 will be removed from the slot 31 by pressure upon the part 26 of the lever substantially over the fulcrum or pivotal point 27, whereupon the part 26 and consequently its terminal 28 will be carried downwardly and the pin 22 removed from the slot. Whereupon, pressure being applied upon the front edge of the plate 16, it and the lens carrying frame will be pushed backwardly toward the camera box until the free end of the spring 19 again engages the end 13 of the slot 12 in the guideway plate, whereupon the locking pin 20 will be withdrawn from the opening in the base plate 44 of the lens frame and then the lens frame, the bellows being collapsed meantime, will be pressed backwardly into the recess provided for it in the camera box and the front board may then be closed as usual.

The simplicity, compactness and mechanical adaptability of the apparatus to the work required of it will be at once obvious to those who are familiar with this art. It will also be obvious that modifications may be made in many of the parts without departing from the essentials of the invention. The construction which we have specifically illustrated and described is one form only of many in which the parts may be made. We therefore do not limit ourselves to the details, although claiming some of them in part, since we regard them as practical and desirable forms in which to construct the parts involved.

We claim:

1. A photographic camera having a movable plate adapted to support and guide the lens frame, a pivoted lever adapted to engage with and when swung upon its pivot to move the movable plate, and an index to determine the degree of movement of the lever.

2. A photographic camera having a movable plate adapted to support and guide the lens frame, a pivoted lever adapted to engage with and when swung upon its pivot to move the movable plate, and an index provided with means whereby the lever may be locked to it at predetermined points.

3. A photographic camera having a movable plate adapted to support and guide the lens frame, a pivoted lever adapted to swing in a plane parallel to that of the plate, means on the plate adapted to interlock with means on the lever when the plate is partly projected, and an index to determine the degree of movement of the lever.

4. A photographic camera having a movable plate adapted to support and guide the lens frame, a pivoted lever adapted to swing in a plane parallel to that of the plate, means on the plate adapted to interlock with means on the lever when the plate is partly projected, an index to determine the degree of movement of the lever, and means whereby the lever may be locked to the index.

5. An automatic focusing device for cameras embodying a movable lens supporting and guiding part, a pivoted lever adapted to swing in a plane parallel to that of the plate, means on the lens supporting part adapted to interlock with one end of the lever, and an index to determine the position of the lever.

6. An automatic focusing device for cameras embodying movable lens supporting and guiding devices, a pivoted resilient lever, means on the lens supporting devices with which the lever will automatically interlock during the outward movement of the lens, and an index to determine the degree of movement of the lens when the lever is swung.

7. An automatic focusing device for cameras embodying movable lens supporting and guiding devices, a pivoted resilient lever, means on the lens supporting devices with which the lever will automatically interlock during the outward movement of the lens, an index to determine the degree of movement of the lens when the lever is swung and means whereby the lever may be locked to the index.

8. An automatic lock focusing device for cameras embodying a pivoted lever adapted to engage with and when swung on its pivot to move the lens supporting devices and one end of which is resilient, means on the resilient end adapted to interlock with means on the lens support, and an index to determine the position of the lever.

9. An automatic lock focusing device for cameras embodying a pivoted lever one end of which is resilient, means on the resilient end adapted to interlock with means on the lens support, an index to determine the position of the lever, and means on the index to lock the lever in its several positions, the construction and arrangement of the parts being such that when they are interlocked movement of the lever will move the lens.

10. An automatic lock focus apparatus for cameras embodying a two part lever, one part being pivoted, and the other part fastened to the first part but adapted for independent spring action, and means upon the last named part adapted to interlock with the lens supporting devices.

11. An automatic lock focus apparatus for cameras embodying a two part lever one part being pivoted and the other part fastened to the first part but adapted for independent spring action, means upon the last named part adapted to interlock with the lens supporting devices, and an index to determine the several positions of the lever.

12. An automatic lock focus apparatus for cameras embodying a two part lever one part being pivoted and the other part fastened to the first part but adapted for independent spring action, means upon the last named part adapted to interlock with the lens supporting devices, and an index to determine the several positions of the lever, said index having means whereby the lever may be locked to it in its several positions.

In testimony whereof we have signed our names to this specification in the presence of two subscribing witnesses.

CARL BORNMANN.
GEORGE W. TOPLIFF.

Witnesses:
A. DEICHELMANN,
H. P. MOXON.